(12) United States Patent
Jadav et al.

(10) Patent No.: US 11,025,643 B2
(45) Date of Patent: Jun. 1, 2021

(54) MOBILE MULTI-PARTY DIGITALLY SIGNED DOCUMENTS AND TECHNIQUES FOR USING THESE ALLOWING DETECTION OF TAMPER

(71) Applicant: International Business Machines Corporation, Armonk, NY (US)

(72) Inventors: Divyesh Jadav, San Jose, CA (US); Rabimba Karanjai, Houston, TX (US); Lawrence Koved, Pleasantville, NY (US); Gabriel Alatorre, Long Beach, CA (US)

(73) Assignee: International Business Machines Corporation, Armonk, NY (US)

(*) Notice: Subject to any disclaimer, the term of this patent is extended or adjusted under 35 U.S.C. 154(b) by 204 days.

(21) Appl. No.: 16/372,593

(22) Filed: Apr. 2, 2019

(65) Prior Publication Data
US 2020/0322351 A1    Oct. 8, 2020

(51) Int. Cl.
*G06F 21/64* (2013.01)
*H04L 29/06* (2006.01)
*H04L 9/32* (2006.01)

(52) U.S. Cl.
CPC .......... *H04L 63/123* (2013.01); *G06F 21/645* (2013.01); *H04L 9/3221* (2013.01); *H04L 63/08* (2013.01); *H04L 9/3247* (2013.01); *H04L 9/3268* (2013.01); *H04L 2209/38* (2013.01)

(58) Field of Classification Search
CPC ..... H04L 63/123; H04L 9/3221; H04L 63/08; H04L 9/3247; H04L 9/3268; H04L 2209/38; G06F 21/645; G06F 21/64
See application file for complete search history.

(56) References Cited

U.S. PATENT DOCUMENTS

| | | | |
|---|---|---|---|
| 7,117,367 B2* | 10/2006 | Carro | G06F 21/6218 713/176 |
| 8,417,946 B2* | 4/2013 | Nguyen | G06F 21/6245 713/167 |
| 9,122,846 B2 | 9/2015 | Buldas et al. | |

(Continued)

OTHER PUBLICATIONS

"IBM Mobile Identity: Technology Preview", downloaded from http://mi.ibmjstart.com/ on Apr. 13, 2018.

*Primary Examiner* — Malcolm Cribbs
(74) *Attorney, Agent, or Firm* — Harrington & Smith

(57) ABSTRACT

Authenticated base digital document(s) are issued to client (s) by an issuing party, and aggregate digital document(s) are received. An aggregate digital document includes base digital document(s) and attachment(s). Authenticity of the aggregate digital document(s) is verified, resulting in authenticated aggregate digital document(s), which are stored and/or redistributed. Authentication challenge(s) are sent by a verifying party to a client requesting part or all of an aggregate digital document from the client be verified. The part or all of the aggregate digital document is received and authenticity and integrity are verified, resulting in an authenticated aggregate digital document. The client verifies authenticity of a base digital document and receives the authentication challenge(s) for an authenticated aggregate digital document and sends part or all of the authenticated aggregate digital document to the verifying party for verification by the verifying party.

21 Claims, 9 Drawing Sheets

(56) References Cited

U.S. PATENT DOCUMENTS

| | | | |
|---|---|---|---|
| 9,473,306 B2 | 10/2016 | Buldas et al. | |
| 10,320,778 B2* | 6/2019 | Poder | G06F 21/64 |
| 2003/0023858 A1* | 1/2003 | Banerjee | H04L 9/3263 |
| | | | 713/189 |
| 2003/0056139 A1* | 3/2003 | Murray | G06F 11/1464 |
| | | | 714/4.1 |
| 2004/0054906 A1* | 3/2004 | Carro | G06F 21/64 |
| | | | 713/171 |
| 2004/0255116 A1* | 12/2004 | Hane | H04L 9/3247 |
| | | | 713/161 |
| 2005/0262353 A1* | 11/2005 | Gentry | H04L 9/3073 |
| | | | 713/176 |
| 2007/0168672 A1* | 7/2007 | Izu | G06Q 20/4012 |
| | | | 713/176 |
| 2011/0238632 A1* | 9/2011 | Vandervort | G06F 16/93 |
| | | | 707/690 |
| 2012/0317412 A1 | 12/2012 | Zaverucha et al. | |
| 2015/0200783 A1 | 7/2015 | Abt, Jr. et al. | |
| 2017/0048216 A1 | 2/2017 | Chow et al. | |
| 2017/0070350 A1 | 3/2017 | Ryu et al. | |
| 2017/0301052 A1* | 10/2017 | Abt, Jr. | H04L 9/3247 |
| 2018/0367310 A1* | 12/2018 | Leong | H04L 9/0861 |
| 2020/0106601 A1* | 4/2020 | Mishra | H04L 63/0876 |

\* cited by examiner

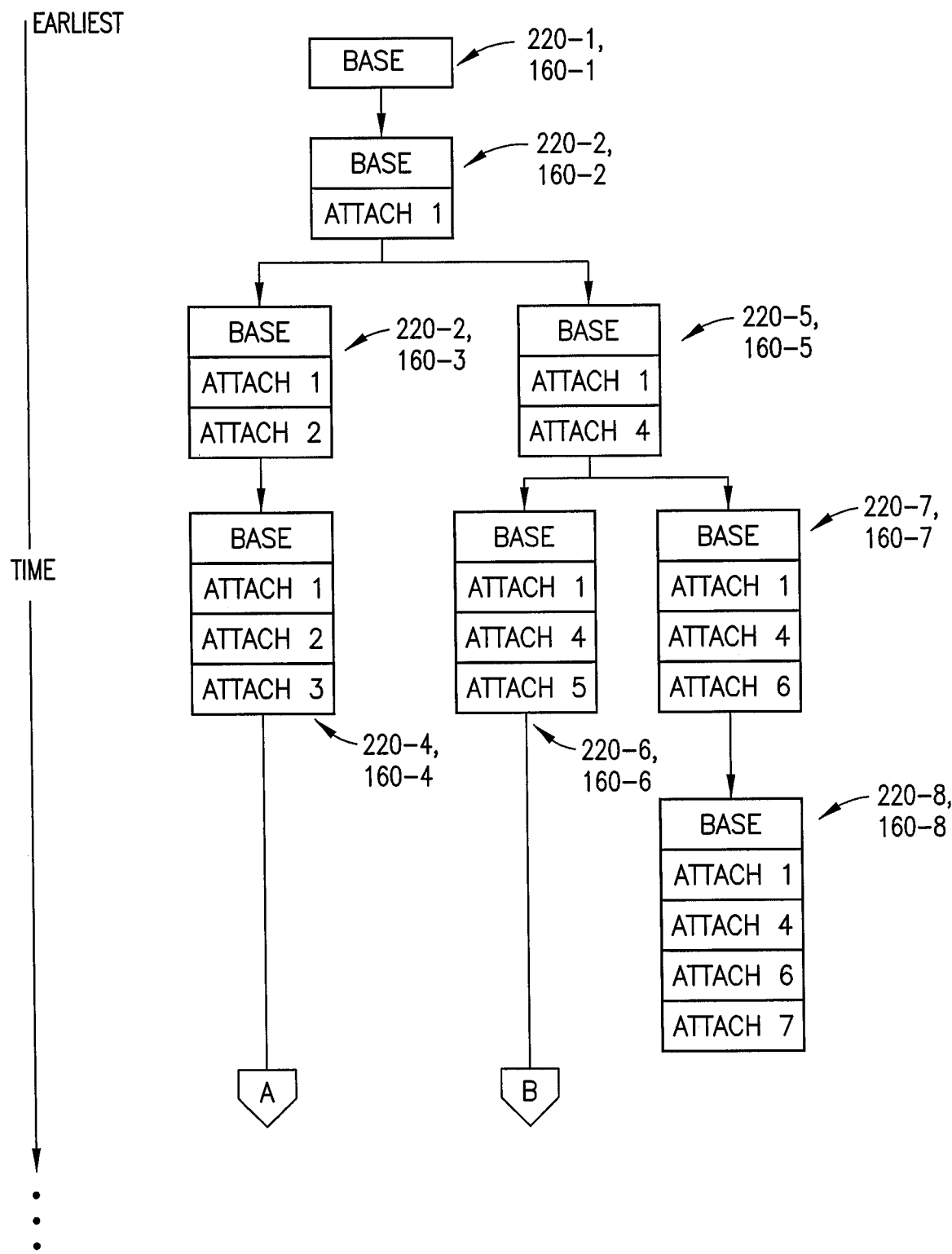
FIG.3: FIG. 3A

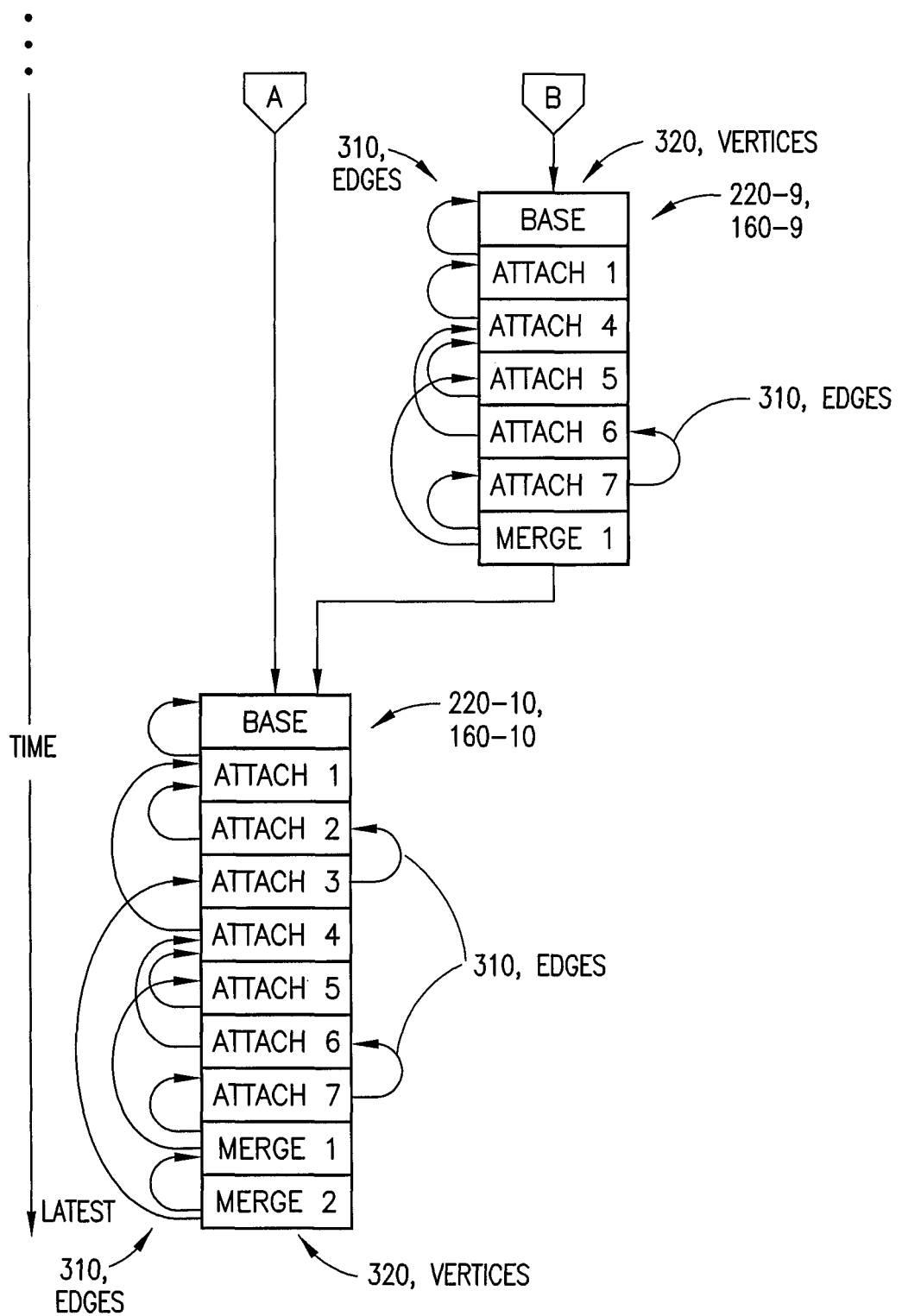
FIG.3: FIG. 3B

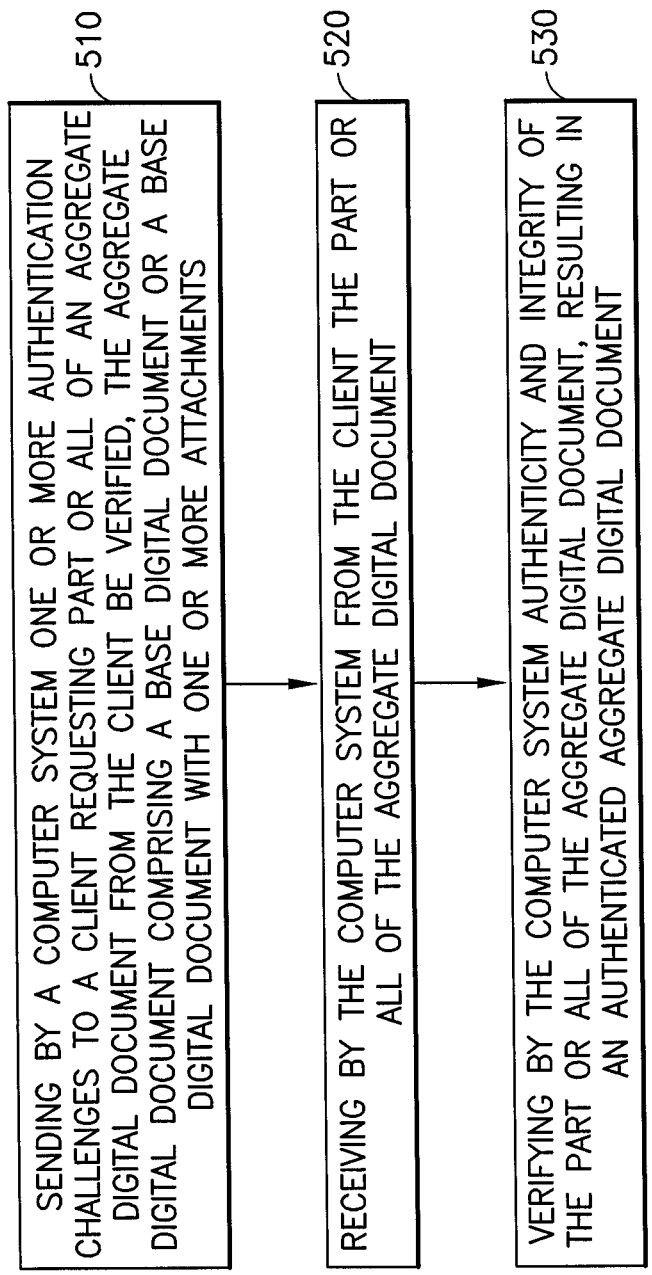

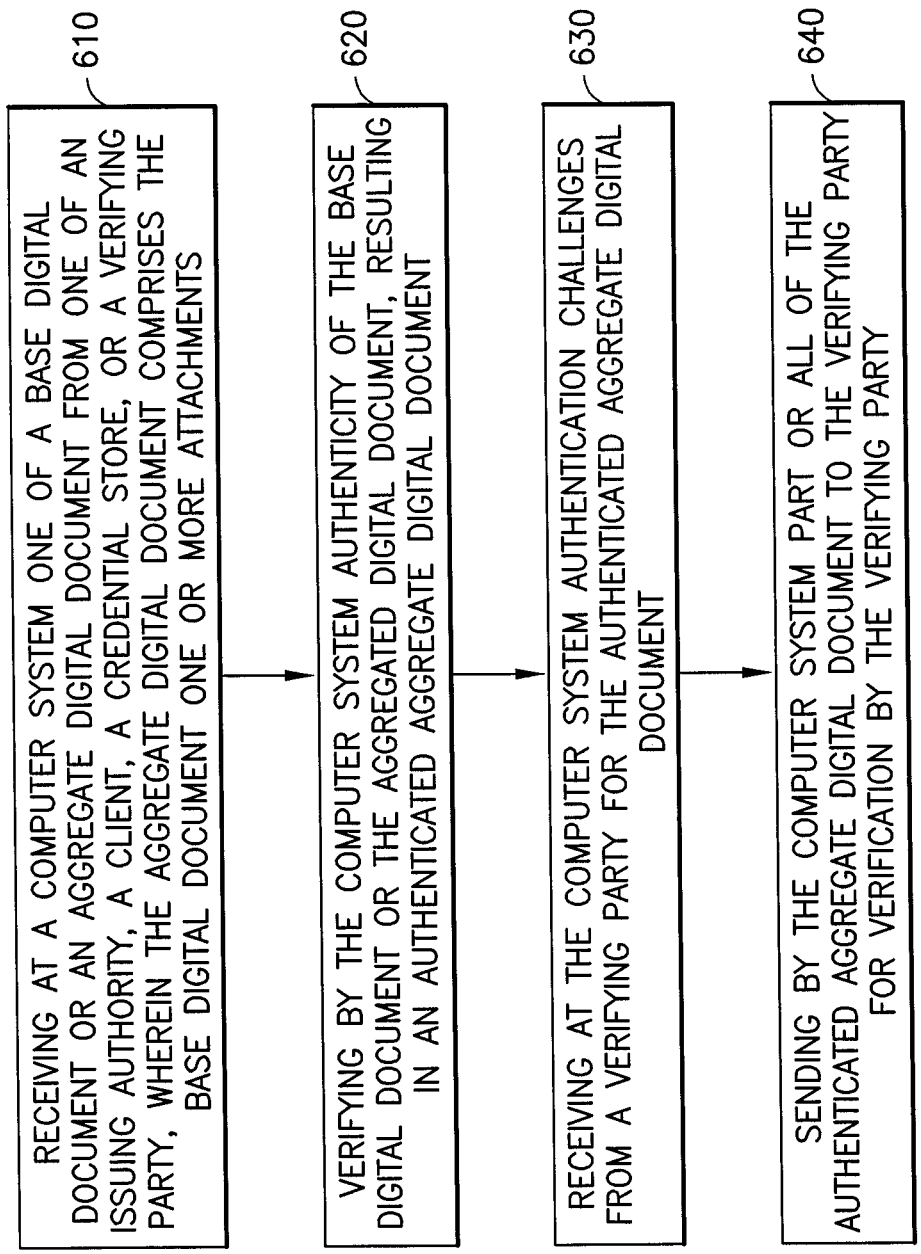

MOBILE MULTI-PARTY DIGITALLY SIGNED DOCUMENTS AND TECHNIQUES FOR USING THESE ALLOWING DETECTION OF TAMPER

BACKGROUND

This invention relates generally to using digitally signed documents, and, more specifically, relates to mobile multi-party digitally signed documents and techniques for using these allowing detection of tamper.

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Abbreviations that may be found in the specification and/or the drawing figures are defined below, toward the beginning of the Detailed Description.

The generation and maintenance of multi-party digitally signed documents remain a challenge, particularly for mobile and other applications where online access for verification and update is not always available. A representative use case is digital passports, where the base document, the passport, may be issued by one country, yet it is to be updated by representatives from other governments. For example, a traveler's passport may be issued by the U.S. Department of State, but will receive updates in the form of entry/exit stamps from agencies of other countries that the traveler visits, or may have a visa (electronically) "stapled" to the passport.

Multiple challenges arise for the generation and maintenance of multi-party digitally signed documents, including but not limited to the following.

The base document and any attachments (stamps, visas, and the like) may not be modified directly, since this would invalidate the digital signature of the issuing authority or any intermediate agencies that update the document.

Updates to the base document or any of the attachments might need to be performed while the traveler is in a location where a record of these updates can not immediately be communicated to the base document issuing authority. This may occur, for instance, in case of a network failure, a system failure, unavailability of the internet, or use of a non-participating agency.

The issuing agency and/or any of the agencies that provided attachments need to be notified of changes to the base document or any of its attachments.

It is important to be able to detect when a traveler tries to "cheat" by removing or modifying any of the attachments. Similarly, it is important to be able to detect when an intermediate agency tries to "cheat" by removing or modifying any of the attachments.

The base document and attachments need to be verifiable by a third party (a "verifying identity") even when the issuing authority is not online. The issuing authority may not be online because of, e.g., a network failure, a system failure, unavailability of the Internet. Additionally, the use of a non-collaborating agency may cause a verification failure, since the non-collaborating agency might update the document, but the updates would not be verified since the non-collaborating agency does not adhere to the protocol for updating the document. Also, root of trust is an issue in this case. For instance, web browsers contain certificates from multiple roots of trust in order to, e.g., perform SSL communications over the Internet. The non-collaborating agency might not have a root of trust or have a root of trust not accessible using the protocol being used.

Due to network connectivity or other issues, there may be multiple versions of the document and attachments. These will need to be merged and therefore reconciled in a trusted manner.

Similarly, in a normal course of operation, there may be more than one version of the document, each with separate updates to the base document, that need to be merged to achieve a single consistent view of the entire aggregate document (e.g., a base document plus updates).

SUMMARY

This section is meant to be exemplary and not meant to be limiting.

In an exemplary embodiment, a method comprises issuing by a computer system one or more authenticated base digital documents to one or more clients, and receiving by the computer system one or more aggregate digital documents. An aggregate digital document comprises one of the one or more base digital documents and one or more attachments. The method includes verifying authenticity of the one or more aggregate digital documents, resulting in corresponding one or more authenticated aggregate digital documents. The method includes performing by the computer system one or both of storing and redistributing the received one or more authenticated aggregate digital documents.

In another exemplary embodiment, a computer system is disclosed comprising memory having computer readable code thereon and one or more processors. The one or more processors, in response to retrieval and execution of the computer readable code cause the computer system to perform operations comprising: issuing by the computer system one or more authenticated base digital documents to one or more clients; receiving by the computer system one or more aggregate digital documents, wherein an aggregate digital document comprises one of the one or more base digital documents and one or more attachments; verifying authenticity of the one or more aggregate digital documents, resulting in corresponding one or more authenticated aggregate digital documents; and performing by the computer system one or both of storing and redistributing the received one or more authenticated aggregate digital documents.

In another example, a computer program product is disclosed that comprises a computer readable storage medium having program instructions embodied therewith. The program instructions are executable by a computer system to cause the computer system to perform operations comprising: issuing by a computer system one or more authenticated base digital documents to one or more clients; receiving by the computer system one or more aggregate digital documents, wherein an aggregate digital document comprises one of the one or more base digital documents and one or more attachments; verifying authenticity of the one or more aggregate digital documents, resulting in corresponding one or more authenticated aggregate digital documents; and performing by the computer system one or both of storing and redistributing the received one or more authenticated aggregate digital documents.

In another exemplary embodiment, another method is disclosed that comprises sending by a computer system one or more authentication challenges to a client requesting part or all of an aggregate digital document from the client be verified. The aggregate digital document comprises a base digital document or a base digital document with one or more attachments. The method includes receiving by the computer system from the client the part or all of the aggregate digital document, and verifying by the computer system authenticity and integrity of the part or all of the aggregate digital document, resulting in an authenticated aggregate digital document.

In another exemplary embodiment, a computer system is disclosed comprising memory having computer readable code thereon and one or more processors. The one or more processors, in response to retrieval and execution of the computer readable code cause the computer system to perform operations comprising: sending by a computer system one or more authentication challenges to a client requesting part or all of an aggregate digital document from the client be verified, the aggregate digital document comprising a base digital document or a base digital document with one or more attachments; receiving by the computer system from the client the part or all of the aggregate digital document; and verifying by the computer system authenticity and integrity of the part or all of the aggregate digital document, resulting in an authenticated aggregate digital document.

In another example, a computer program product is disclosed that comprises a computer readable storage medium having program instructions embodied therewith. The program instructions are executable by a computer system to cause the computer system to perform operations comprising: sending by a computer system one or more authentication challenges to a client requesting part or all of an aggregate digital document from the client be verified, the aggregate digital document comprising a base digital document or a base digital document with one or more attachments; receiving by the computer system from the client the part or all of the aggregate digital document; and verifying by the computer system authenticity and integrity of the part or all of the aggregate digital document, resulting in an authenticated aggregate digital document.

A further exemplary embodiment is a method. The method comprises receiving at a computer system one of a base digital document or an aggregate digital document from one of an issuing authority, a client, a credential store, or a verifying party. The aggregate digital document comprises the base digital document one or more attachments. The method includes verifying by the computer system authenticity of the base digital document or the aggregated digital document, resulting in an authenticated aggregate digital document. The method further includes receiving at the computer system authentication challenges from a verifying party for the authenticated aggregate digital document, and sending by the computer system part or all of the authenticated aggregate digital document to the verifying party for verification by the verifying party.

In another exemplary embodiment, a computer system is disclosed comprising memory having computer readable code thereon and one or more processors. The one or more processors, in response to retrieval and execution of the computer readable code cause the computer system to perform operations comprising: receiving at a computer system one of a base digital document or an aggregate digital document from one of an issuing authority, a client, a credential store, or a verifying party, wherein the aggregate digital document comprises the base digital document one or more attachments; verifying by the computer system authenticity of the base digital document or the aggregated digital document, resulting in an authenticated aggregate digital document; receiving at the computer system authentication challenges from a verifying party for the authenticated aggregate digital document; and sending by the computer system part or all of the authenticated aggregate digital document to the verifying party for verification by the verifying party.

In another example, a computer program product is disclosed that comprises a computer readable storage medium having program instructions embodied therewith. The program instructions are executable by a computer system to cause the computer system to perform operations comprising: receiving at a computer system one of a base digital document or an aggregate digital document from one of an issuing authority, a client, a credential store, or a verifying party, wherein the aggregate digital document comprises the base digital document one or more attachments; verifying by the computer system authenticity of the base digital document or the aggregated digital document, resulting in an authenticated aggregate digital document; receiving at the computer system authentication challenges from a verifying party for the authenticated aggregate digital document; and sending by the computer system part or all of the authenticated aggregate digital document to the verifying party for verification by the verifying party.

BRIEF DESCRIPTION OF THE SEVERAL VIEWS OF THE DRAWINGS

FIG. 3, split over FIGS. 3A and 3B, illustrates linear representations of the aggregate documents, as the actions in FIG. 2 occur;

FIG. 5 is a flowchart of an exemplary method performed by a verifying party, in accordance with an exemplary embodiment; and FIG. 6 is a flowchart of an exemplary method performed by a client, in accordance with an exemplary embodiment.

DETAILED DESCRIPTION

Figure 1:
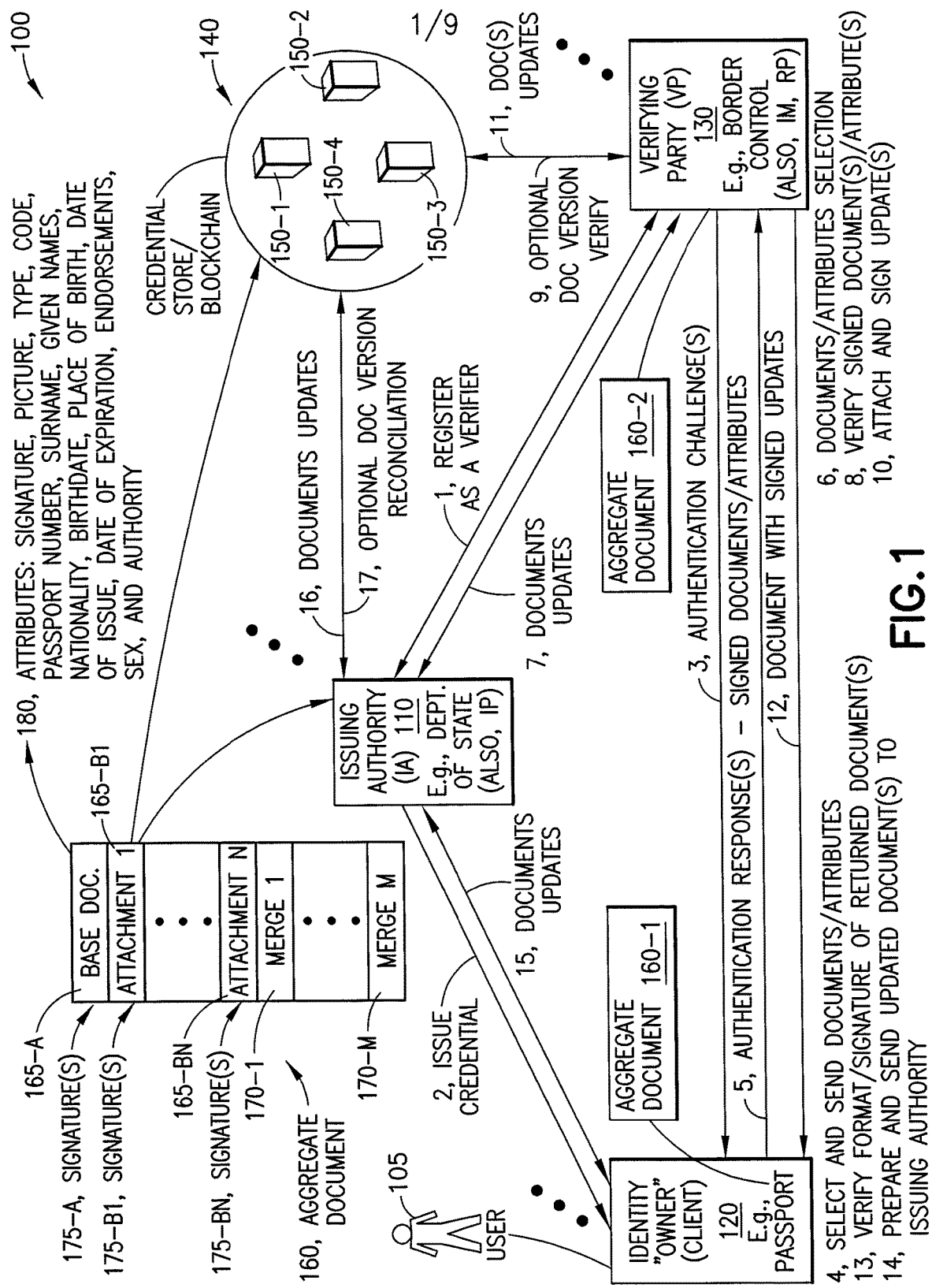
FIG. 1 is a block diagram of an exemplary representative system and corresponding high level flow for an exemplary embodiment.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The following abbreviations that may be found in the specification and/or the drawing figures are defined as follows:

AS Authoritative Source
attach attachment
doc document
EU European Union
HTTP Hypertext Transfer Protocol
HTTPS HTTP Secure
IBM International Business Machines Corporation
I/F interface
IA Issuing Authority
IM Identity Modifier
IP or IdP Identity Provider
LAN local area network
N/W network
OCSP Online Certificate Status Protocol
PKI public key infrastructure
RP relying party
SSL Secure Sockets Layer
TCP/IP Transmission Control Protocol/Internet Protocol
UI user interface
USB universal serial bus
VP Verifying Party
WAN wide area network For ease of reference, the rest of this document is divided into sections.

I. Introduction

As described above, there are multiple challenges that arise for the generation and maintenance of multi-party digitally signed documents. How these challenges are addressed is described below, after additional introduction into this area is provided. This introduction relates to subject matter that currently exists and that might be used with the examples provided herein.

Digitally signing documents is a well understood technology. Recent work has demonstrated that this technology can be used for a wide range of applications to replace physical credentials, including licenses, tickets and other forms of government or institutional identification. See, for instance, International Business Machines Corporation's Mobile Identity, which is a private and secure ecosystem of identity relationships that enables all involved to issue, manage, or verify a user's identities using single-party digitally signed documents.

Most of these digital documents are simple in the sense that a single or a small number of issuers sign the documents. These documents are infrequently updated. These documents can be verified by a verifying party by verifying the digital signature(s) on the document. These documents can be easily verified, whether the verification entity is online or offline. There are various schemes for ensuring freshness and liveness of the digital documents, including the use of Certificate Revocation Lists and OCSP for identifying when a certificate associated with a digital signature has been revoked.

There are many commercial offerings that allow for digital signing of digital documents. Some of these allow for multiple parties to digitally sign the same document. Typical solutions are for signing legal documents, such as contracts, and the resulting documents are stored in a central or distributed database.

Merkle trees and secure audit logs have existed for over 30 years. These data structures provide for secure and auditable recording of events. In particular, these data structures provide tamper detection.

Distributed databases and remote access to web services have existed for over 20 years. They can be accessed via a network, including the internet and over protocols such as TCP/IP and HTTPS. Distributed and replicated databases allow for multiple parties to share data and provide access to that data across geographically distributed systems.

Blockchain technology supports a secure decentralized multi-party permanent record of a set of events. Either a permissionless blockchain, such as BitCoin, where anonymous participants are able to record events (e.g., transfer bitcoins between parties), or a permissioned blockchain can be used (such as Hyperledger). Hyperledger is an open source collaborative effort created to advance cross-industry blockchain technologies. Permissioned blockchains are intended for the sharing of data, where the parties have at least a minimal level of mutual trust, and data of interest is to be shared by two or more parties and can be recorded in a public (or semi-public) fashion. While the data is nominally public, cryptographic technologies can be used to limit the disclosure of the details of the data posted to the blockchain. The disclosure of this data can be limited to pairwise parties or the disclosure can be multi-party. Some permissioned blockchains, such as Hyperledger, have the concept of an "audit" function, where a third party is able to verify various transactions on the blockchain even when the transactions recorded in the blockchain are encrypted.

II. Overview of Examples

Now that an introduction has been provided, an overview of the exemplary embodiments is provided. Certain exemplary embodiments may provide one or more of the following:

1. Tamper prevention and detection for distributed multi-party documents that work both online and offline—preventing an untrusted client from, e.g., removing attachments (e.g., reverting to an earlier version of the multi-part document);

2. Prevention of false attachments from being attached by an untrustworthy client device or verifying identity;

3. After-the-fact updating of a multi-party document (e.g., and a credential store) by the verifying identity or via the (e.g., mobile) client when either is not able to update the issuer (e.g., an identity provider) at the time of the multi-part document update;

4. Support for these multi-part documents across multiple client devices; and/or 5. Optionally use secure mobile client hardware (e.g., TrustZone, which is hardware-based security built into a system-on-a-chip by semiconductor chip designers who want to provide secure end points and a device root of trust) or other secure hardware (e.g., hardware-assisted security provided by processor manufacturers such as Intel) to prevent unauthorized client-side modification to the multi-part documents.

In exemplary embodiments, we define techniques for creating updateable verifiable mobile multi-party digital documents that contain the following properties. Digital documents and updates to these documents can be verified by a verifying party both online and offline via digital signatures. Verifiable updates to these digital documents can be performed both online and offline. The issuing authority and/or any of the agencies that provided attachments (e.g., updates) to the digital documents can be notified of updates to these documents. Tamper detection is provided of the original digital document and any of the attachments to the original digital document. Details of the unauthorized modifications, or concurrent changes, can be identified and resolved by an arbiter (e.g., the issuing authority or a client).

We start with a basic concept of a secure digitally signed document, such as a driver's license or passport, issued by an issuing authority (IA). Such IA may be referred to in the literature by other terms, such as an Identity Provider (IP or IdP) or Authoritative Source (AS). For ease of reference and clarity, only the term "issuing authority" is used herein. The issuing authority is the provider of a base, perhaps authoritative, document (e.g., license, contract, passport, and the like). The IBM Mobile Identity may be used as a representative example for issuing and managing these documents, both by the IA and on the endpoints (e.g., mobile devices). In a mobile document scenario, the document is stored on the mobile device and is "verified" (that is, determined to be legitimate) when a verifying party (VP) verifies the digital signature(s) on the document, and/or (1) one or more properties of the document, and/or (2) attributes contained in the document. A VP may also be referred to in the literature as a Relying Party (RP) or verifier or Identity Modifier (IM). For ease of reference and clarity, only the term "verifying party" is used herein. The verifying party is an entity that wants to verify the authenticity of a (single- or multi-party) document, or attributes of such a document. Such a document may contain one or more parts as will be described herein.

As before, the digital document is issued by the IA and distributed to the "owner" of the document, which may be a user (a human being), a process, or other legal or computational entity. For verification, the device (a client) transmits the digital document to the verifying party (VP). The VP will verify the legitimacy of the digital document (e.g., verify the digital certificates, digital signatures, and the like) and, where appropriate, send an updated digital document back to the client. Four basic operations are considered in an exemplary embodiment.

Operation 1. The VP receives the digital multi-party document from the client. The document's integrity is verified (by, e.g., verifying digital certificates, digital signatures, and the like).

Operation 2. The VP may provide any new attachments to the digital multi-party document (or parts thereof) received from the client. This updated document is a composite (called an aggregate) of the base digital document plus any previous updates/additions (as described below) as added attachments.

Operation 3. The VP communicates the updated digital document (or updated parts thereof) from the VP to the client device.

Operation 4. The VP communicates the updates, if possible, to the digital document to the IA, as well as to any other interested party.

Updates to the digital document, per an exemplary embodiment, proceed as follows.

To the base digital document scheme, we add an ability to add attachments to the base digital document. In an example of a passport scenario, these attachments represent the digital equivalent of a passport stamp, travel visa, or other update related to the passport. Rather than being a single digitally signed document (e.g., a file), the document is now represented as a data structure comprising multiple digitally signed entries. Logically, each entry in the data structure represents either the base digital document or an attachment such as from a VP (e.g., a visa) or other attachment such as a stamp (e.g., immigration stamp).

In the simplest form, the data structure can be represented as a simple secure audit log of digitally signed entries. Each entry (e.g., attachment plus signature) in the data structure should incorporate all of the prior entries, including the digital signatures, to ensure integrity and to verify the order of the entries in the entire composite document, not just the signature of the most recent entry in the secure audit log.

Another approach is to use a secure tree structure, such as a Merkle tree, to represent that each new entry to the data structure is attached as a child to the relevant parent in the tree. For example, a passport entry stamp is attached as a child to the base passport entry. A passport exit stamp is therefore attached as a sibling to the passport entry stamp. Since this is a Merkle tree, each appender to the tree will update the signatures in the tree from the current insertion node up through the root. These signatures may be additional signatures, not replacements, of the existing signatures in the tree.

Secure client hardware and software (e.g., TrustZone), if used, prevents unauthorized modification of the multi-part document by both storing and signing the document(s). There are multiple ways to store and verify the integrity of the document(s). For instance, two possible exemplary options are as follows: 1) store the document in the secure hardware, only readable by the hardware, or 2) store a current hash in the secure hardware. In both cases, the secure hardware computes the hash and performs a handshake with the RP or IP to verify integrity of the (multi-part) document and the hash.

Untrustworthy clients or verifiers are prevented from misrepresenting the current state of the multi-party documents through a combination of digital signatures and communication with the issuer (IA), whether directly (e.g., messages) or via a shared database (e.g., blockchain).

III. Additional Detail: Exemplary System and Methods

Now that an overview has been provided, additional detail is provided. Before proceeding with the additional detail, it is helpful to define terminology and provide rules that are used herein. It should be noted that this terminology and these rules are used for ease of reference and clarity. The terminology and rules used herein are as follows.

A "base document" is the original content to which all subsequent attachments directly, or indirectly, refer. This could be a driver's license, plane ticket, passport, and the like.

An "attachment" is an added document, with content such as text or binary data, that is attached to (e.g., refers to) the base document or one or more other previous attachments.

An "aggregate document" is the base document with a (possibly empty) set of attachments.

A "merge" is where two or more aggregate documents (with the same base document) are brought together (e.g., via reconciliation) to create a new single (consistent, reconciled) aggregate document.

A "merge record" is a record of a merge and may be kept in an aggregate document, e.g., to provide for verifiability and traceability of the merged aggregate document.

An "attribute" is content such as text or binary data (e.g., passwords, pictures, video, and the like) that forms part of the base document or an attachment.

Any base document can have zero or more attachments.

Any attachment can have zero or more attachments.

The references from attachments (and also merges) form an acyclic graph that terminates at the base document.

With this terminology and these rules in mind, turn now to FIG. 1. This figure is a block diagram of an exemplary representative system 100 and a corresponding high level flow for an exemplary embodiment. In this example, four entities are shown: a client 120 (which is the identity "owner" and is owned/used by a user 105); an issuing authority (IA) 110; a verifying party (VP) 130; and a credential store 140, such as a blockchain. The credential store 140 is a database that stores the aggregate document 160, which is a multi-party, digitally signed document. Multiple servers 150-1, 150-2, 150-3, and 150-4 might be used to store the aggregate document 160. The aggregate document 160 may also be stored at the issuing authority 110 and copies of this document may exist (possibly with modifications) at the client 120 and the verifying party 130. The aggregate document 160 may also be called a "multi-party" document, as the multiple entities 110, 120, and 130 can access and modify the aggregate document 160. Although not previously discussed, the IA 110 can also update aggregate documents, not just the client 120 and VP 130.

The aggregate document 160 is a document data structure comprising multiple entries 165 in this example. There is a base document 165-A, and N added attachments 165-B1 through 165-BN. The original aggregate document 160 consisted only of the original entry 165-A (a base document) and the other entries 165-B were added later. Attributes 180 are shown for the base document 165-A, for a passport example, and include the following: signature (e.g., in pen), picture, type, code, passport number, surname, given names, nationality, birthdate, place of birth, date of issue, date of expiration, endorsements, sex, and authority. Other examples, such as a license example, would have a different set of attributes. Each attachment 165-B could also have attributes 180, although these are not shown in FIG. 1. Each entry 165 comprises one or more signatures 175. For instance, the original base document 165-1 comprises signature(s) 175-A, while added attachments 165-B1 through 165-BN comprise corresponding signatures 175-B1 through 175-BN. There may also be a number of merge records 170-1 through 170-M, and these indicate merges that have taken place. Note that the merge records 170 and attachments 165 are shown as being separate, but can be interspersed (e.g., a merge record 170 could occur between two attachments 165 and vice versa).

Figure 1A:
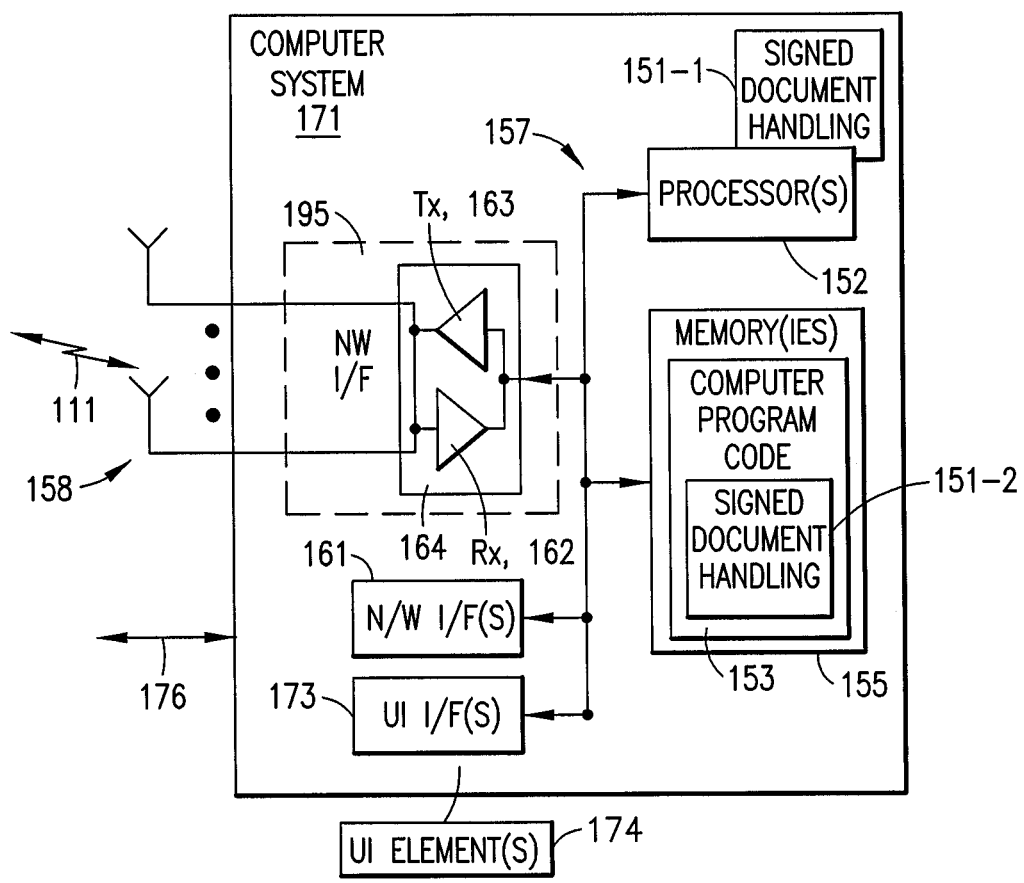
FIG. 1A is an example of a computer system that can be used in any of the electronic devices in FIG. 1.
Figure 1B:
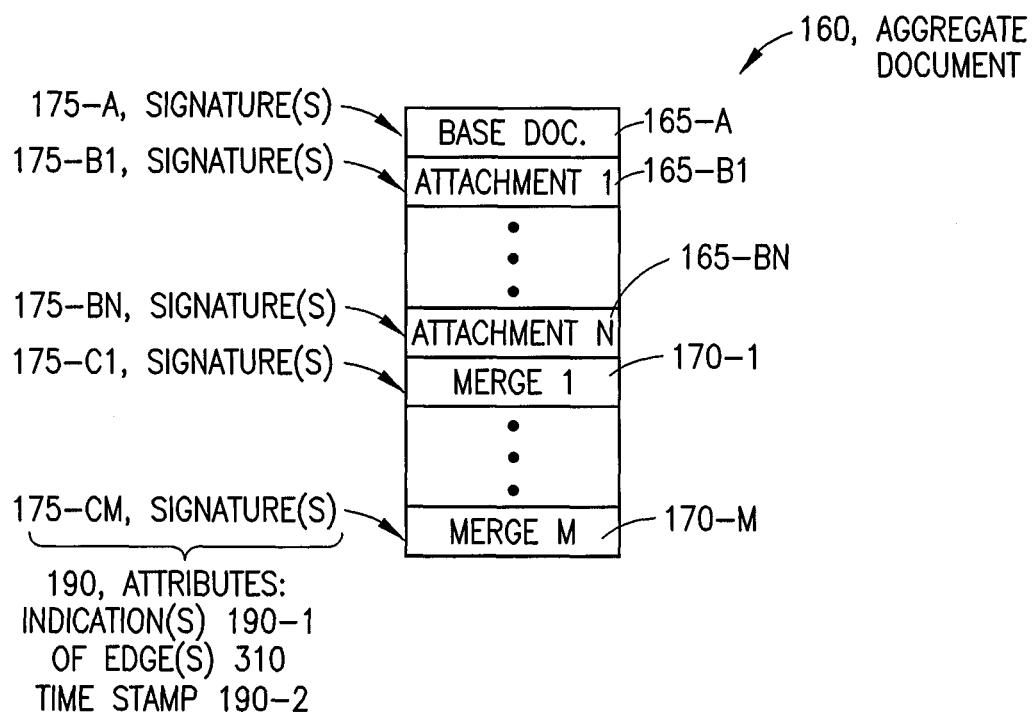
FIG. 1B is an example of an aggregate document 160, in an exemplary embodiment.

Due to space constraints, FIG. 1 only has a limited view of the aggregate document 160. Referring to FIG. 1B, this figure shows additional detail of an example of the aggregate document 160. The merges 170 (merge 1 170-1 through merge 170-M) may also have signature(s) 175-C1 through 175-CM, respectively, in each of the entries for the merges 170. The signatures 175-C may be signatures of the entity that performed the merge. Examples of merges are described in reference to FIGS. 2 and 3. The user (e.g., client 120) or the VP 130 can perform a merge, not just the IA 110.

In a broader sense, each entry 165, 170 may have one or multiple attributes 190, such attributes 190 including the signatures 175. Additional attributes 190 include indication(s) 190-1 of edge(s) 310. Edges are part of an acyclic graph representation of the aggregate document 160, connect nodes (in this case, the entries 165/170) in the graph, and are illustrated in FIG. 3. Each entry 165/170 should have at least one edge 310 to connect the entry to other entries 165/170, except for the base document 165-A, which might not have an edge 310, as it is a beginning of the acyclic graph. Other possible attributes 190 include time stamps 190-2, where each time stamp 190-2 indicates a time at which the corresponding attachment 165-B or merge 170 occurred.

Turning back to FIG. 1, the primary example that will be used to describe FIG. 1 is a passport example, where the issuing authority 110 is, e.g., a governmental agency that issues passports (and, e.g., visas if used) such as a Department of State, the verifying party 130 is governmental agency that checks passports and allows entry into or exit from a country such as a border control agency, and the client 120 is an electronic device containing a digital version of a passport. The client 120 will therefore also be referred to as a client device. While this is the primary example being used, this is only for reference, and many other examples (e.g., driver's licenses, credit cards, voting information, and the like) are also possible.

There are 17 steps shown in FIG. 1. Although in general the flow proceeds from lower-numbered steps to higher-numbered steps, this is not always the case. Some steps, for instance, may be performed in parallel, and other steps may be performed at times that are not in an order indicated by their number, relative to other steps with similar numbers. Therefore, the numbers on the steps are more for reference than for an indication of order of the steps.

It should also be noted that each of the issuing authority 110, client 120, and verifying party 130 have ellipses near them. These ellipses indicate that a system 100 would typically have multiple issuing authorities 110, multiple clients 120, and multiple verifying parties 130. For instance, there could be multiple issuing authorities (e.g., roots of trust). In a web browser example, there are multiple issuing authorities (similar to an issuing authority 110) such as Verisign or Symantec or Entrust.net or DigiCert, Inc., each of which provides digital certification and certificates and forms a root of trust. Banks use those certificates, and may also be issuing authorities based off of the root certificate. This process may repeat with other issuing authorities, thus forming a certificate chain. Verifying parties 130 are able to review and verify the validity of the certificates in the certificate chain. There is a hierarchical trust relationship between the banks as verifying parties 130 and issuing authorities 110 being at the top (e.g., "root") of the relationship. The web browser also uses the certificates and certificate chain at the client 120 to verify the identity of the server to which it is communicating.

In a passport example, the governments of individual countries or groups of countries (e.g., the European Union) would issue passports and therefore there would be many issuing authorities 110. Some element, such as a border control (referred to as the U.S. Customs and Border Protection agency in the U.S.) or a similar governmental organization, as the verifying party 130 checks the validity of the passport, stamps the passport, and addresses visa concerns (if any). As there are many countries with passport and potentially visa systems, there would be many issuing authorities 110 and verifying parties 130. Similarly, there would be many clients 120.

In step 1, the verifying party 130 registers as a verifier with the issuing authority 110. It is noted that verifying party 130 needs to identify itself, as well as receive privileges and appropriate digital certificates needed to verify the digital documents, which is what occurs during registration.

In step 2, the issuing authority 110 issues a credential to the client 120. The credential is a passport in this example. The issuing authority 110 therefore creates the aggregate document 160 and the base document 165-A. Note that the original document may be solely the base document 165-A. The base document 165-A may be communicated from the issuing authority 110 to the client 120 in step 2. Note that steps 1 and 2 may be performed in parallel or different orders (e.g., step 2 before step 1).

At some point, the verifying party 130 is to verify the passport, such as in response to the user 105 presenting himself or herself to a border control (illustrated as verifying party 130) upon, e.g., entry to a country. The client 120 has an aggregate document 160 document 160-1, which is a version of the aggregate document 160. The aggregate document 160-1 held by the client 120 is typically the same as the aggregate document 160 held by the issuing authority 110, but there may be differences at times, as described below. The verifying party 130 presents in step 3 authentication challenge(s) to the client 120. In simple terms, these authentication challenges may be thought of as the following messaging: "Who are you? Send me your documents." Although this is shown as a query from the verifying party 130 toward the client 120, there could be additional messaging, such as messaging from the client 120 toward the verifying party 130, e.g., in simple terms a query might be used such as "I present myself for approval to enter your country; what documents do you need?". This would occur before the authentication challenge(s) listed in step 3.

The client 120 in step 4 selects and sends documents and corresponding attributes. Attributes for an example of a passport might include the following: picture, date of birth, age, current address, gender, eye color, city or country of birth, citizenship, last entry/exit from a country of interest, and the like. The selection may occur because not all information might be necessary for authentication. In the case of a passport, not all of the attributes 180 might be necessary. For instance, the picture, passport number, surname, nationality, date of expiration, sex, authority, and last entry/exit from a country of interest might be necessary, and the other attributes not used (e.g., or only used if necessary, for further verification). In the case of a driver's license, for instance, being verified to allow a person to purchase alcohol, information such as a picture and birthdate might suffice for verification, whereas other information such as address, type of license (e.g., automobile, truck, and the like), whether the person is an organ donor or not, are not necessary for verification. A protocol, such as a zero knowledge proof, may be used between the client 120 and verifying party 130 to demonstrate to the verifying party that the client is in possession of attributes of interest, such as, e.g., the owner is over the age of 21.

The sending of the selected documents is illustrated as step 5, where the client 120 transmits authentication response(s), such as signed documents and corresponding attributes. For example, a sent document may be the base document 165-A, with a partial set of attributes 180. If the user 105 has entered/exited other countries, the sent document could be the base document 165-A and one or more attachments 165-B, along with their associated signatures 175, but possibly with a reduced set of attributes.

The verifying party 130 receives the authentication response(s), including the signed documents/attributes. The information received is represented by the aggregate document 160-2, which is some version of the aggregate document 160-1. In step 6, the verifying party 130 performs its own documents/attribute selection and in step 8 verifies the signed document(s)/attribute(s). For instance, if the user 105 is attempting to enter the EU and the verifying party 130 in the EU receives a visa for Bangladesh, the verifying party 130 in step 6 might not (likely does not) use the visa in step 8. Meanwhile, if the user 105 is attempting to enter Bangladesh and the verifying party 130 in Bangladesh receives a visa for Bangladesh, the verifying party 130 would use the visa in step 8. Thus, step 6 provides a way for the verifying party 130 to ensure the correct documents and attributes needed for verification in step 8 and entry into the particular country are available. Note that if any information is missing, there could be a period of negotiation, illustrated again by step 5, where the verifying party 130 and client 120 communicate so that the verifying party 130 receives the information needed to perform step 8. The verification that occurs in step 8 is used to verify the passport and the associated set of attributes are valid. For a license example, where the license is being used to purchase alcohol in a state with a minimum age of 21, step 6 allows the verifying party 130 to get the information (documents, attributes) needed to verify the age, and the verification of this information occurs in step 8. As previously noted, a zero knowledge proof can be used to verify that the client is in possession of the appropriate attributes without having to disclose the details of the original document/attribute (e.g., age and date of birth).

In step 9, there is an optional document version verify. This is shown being directed toward the credential store 140, but could also be directed toward the issuing authority 110, or possibly through issuing authority 110 to credential store 140. This step allows the verifying party 130 to determine if the document and its attributes are correct by retrieving the latest version of the aggregate document 160. This step also prevents or reduces the chance of unauthorized removal of attachments. As an example, if the user was in Iran, but removes the information indicating an entry/exit in Iran, step 9 allows the verifying party 130 to retrieve the current version of the aggregate document 160, which should contain the information indicating an entry/exit in Iran, and then the verification in step 8 would fail.

In step 10, the verifying party 130 attaches and signs one or more updates. In the context of a passport, a "stamp" could be issued and appended to the aggregate document 160-2, as an attachment 165-B. In terms of a driver's license, the updates could be an indication the user 105 can now drive another class of vehicle, such as a truck or motorcycle. In the case of an identification, the updates could be an indication the user 105 can own a gun.

Both steps 7, 11, and 16 concern document updates. Depending on how the system is implemented, the verifying party 130 will provide an update to one or both of the issuing authority 110 and the credential store 140, which will then need to verify the signatures and integrity of the updated document 160-2 before the issuing authority 110 or credential store 140 updates the aggregate document 160 stored in the issuing authority 110 or credential store 140. If the credential store 140 is the main store for the aggregate document 160 and the issuing authority 110 maintains copies, then the issuing authority 110 could perform the verification and send the verified aggregate document 160 to the credential store 140. Note that the credential store 140 may also receive (step 11) the updated aggregate document 160-2 from the verifying party 130, send (step 16) the aggregate document 160-2 to the issuing authority 110, the issuing authority 110 then performs the verification of the aggregate document 160-2 to create the updated aggregate document 160 and sends the updated aggregate document 160 to the credential store 140. Other options are possible.

In response to receiving (step 12) the document with signed updates (aggregate document 160-2), the client 120 in step 13 verifies the format/signature of the returned document(s). This step validates the received aggregate document 160-2. This may include ensuring that the verifying party 130 did not remove any attachments (165-BN) from the currently held aggregate document 160.

In step 15, the client 120 prepares and sends the updated document(s) to the issuing authority 110. Note that this may go instead to credential store 140 or through credential store 140 to issuing authority 110. This may also go through an authorized updating service (not shown), and the updating service would send the updated aggregate document 160 to one or both of the issuing authority 110 and credential store 140. Regarding the updating service, for grocery stores and the like, credit card transactions often go through a third party and then to the credit card company. The updating service is similar.

Note also that the verifying party 130 might not immediately perform an updating in step 7 or 11. The client 120 also may not perform step 15 immediately. Instead, these updates could be delayed such as by batching, e.g., hourly or daily. Note that the verifying party 130 may not send updates to the credential store 140 or issuing authority 110. In such cases, the system 100 will rely on a third party (not shown) or the client 120 to transmit the updated aggregate document 160.

In step 17, there is an optional document version reconciliation. For example, if one of the issuing authority 110 or the credential store 140 determines a version of the aggregate document 160 is no longer the latest version or has errors, one of these can initiate step 17. For example returning to the example presented above where the user 105 visited Iran but then modified the aggregate document 160-1 to remove the stamp from Iran, the verifying party 130 might have submitted updates (a correct aggregate document 160-2 with stamp) to the credential store 140. These updates might not have been communicated to the issuing authority 110 when the issuing authority 110 receives the aggregate document 160-1, without the stamp. The issuing authority 110 would attempt to update in step 16 this document, and then determine that the credential store 140 has a different version. These two versions could be reconciled in step 17.

Also for step 17, this relates to FIGS. 2 and 3, described below, where multiple versions of the same document exist and need to be reconciled via merges. Multiple (e.g., valid) versions of aggregate document 160 may exist because, e.g., there could be multiple clients 120 used by a single user 105, and each could have a different version of aggregate document 160. Examples of this are described below. Note that step 17 does not have to be synchronized with any other step in FIG. 1.

While in the example of FIG. 1 and other examples herein, the issuing authority 110 send the authenticated aggregate digital document to the client, it is possible for the client to indirectly receive the authenticated aggregate digital document from another client (e.g., peer-to-peer sharing), from a verifier, or other third party. Similarly, exchanges of challenges and/or authenticated aggregate digital documents between clients (the identity owner) and verifying parties may be performed through intermediaries.

For verification of an aggregate document 160, such as in in FIG. 1 or FIG. 1B or other figures or text herein, zero knowledge proofs may be used as a means of verifying cryptographic features of one or more parts of an aggregate document. The concept of a zero knowledge proof allows a party to demonstrate that the provider of the information is in possession of the information. For instance, a zero-knowledge proof is a method by which one party (the prover) can prove to another party (the verifier) that she knows a value x, without conveying any information apart from the fact that she knows the value x. Another way of understanding this would be that interactive zero-knowledge proofs require interaction between the individual (e.g., via a computer system) proving their knowledge and the individual (e.g., via another computer system) validating the proof. Examples of cryptographic features may include, but are not limited to, the person's age, without disclosing the date of birth, state of residence, without disclosing their address, whether or not a drivers license is valid, without disclosing sensitive personal information, or whether the person has visited restricted countries, without disclosing which countries the individual has visited.

The issuing authority 110, client 120, and verifying party 130 are electronic devices, e.g., under control of people such as user 105. Referring to FIG. 1A, this figure illustrates an example of a computer system 171 that can be used in any of the electronic devices in FIG. 1.

The computer system 171 includes as possible circuitry one or more processors 152, one or more memories 155, one or more wired network interfaces (N/W I/F(s)) 161, and one or more wireless network interfaces (N/W I/F(s)) 195, each comprising one or more transceivers 164, and one or more user interface (UI) interfaces 173, all interconnected through one or more buses 157. Each of the one or more transceivers 164 includes a receiver, Rx, 162 and a transmitter, Tx, 163. The one or more transceivers 160 are connected to one or more antennas 158. The one or more memories 155 include computer program code 153. The computer system 171 includes a signed document handling process 150, comprising one of or both parts 150-1 and/or 150-2, which may be implemented in a number of ways. The signed document handling process 150 may be implemented in hardware as signed document handling process 150-1, such as being implemented as part of the one or more processors 152. The signed document handling process 150-1 may be implemented also as an integrated circuit or through other hardware such as a programmable gate array. In another example, the signed document handling process 150 may be implemented as Signed document handling process 150-2, which is implemented as computer program code 153 and is executed by the one or more processors 152. For instance, the one or more memories 155 and the computer program code 153 are configured to, with the one or more processors 152, cause the computer system 171 to perform one or more of the operations as described herein.

The computer system 171 comprises or couples to UI element(s) 174. These elements 174 may be displays (such as a touchscreen or stand-alone display), buttons, keyboards, mice, and the like. The UT I/F(s) 173 are circuitry used to connect the computer system 171 to the UI elements 174.

The one or more wireless network interfaces 195 communicate over a wireless link such as link 111. The wireless network interfaces 195 may be near-field interfaces, such as Bluetooth (a wireless technology standard for exchanging data over short distances from fixed and mobile devices), or local area network interfaces, such as Wi-Fi (a technology for wireless local area networking with devices based on the IEEE 802.11 standards), or the like. The wired N/W I/F(s) 161 may be USB interface, optical interfaces, or LAN/WAN interfaces and communicate via link 176, or the like.

The elements that make up computer system 171 typically change depending on the character of the electronic devices. For instance, the client 120 may be a smartphone or tablet, and the internal configuration for this device would be different from the issuing authority 110, which might be more akin to a server or a cloud system. The verifying party 130 might be similar to a personal computer system, or perhaps a front-end system that connects to a back-end server system. Therefore the computer system 171 is merely exemplary.

IV. Additional Details: Merging of Aggregate Documents

The description of FIG. 1 illustrated a simple example, where the aggregate document 160 was basically the same on all the elements in the system 100. This is not always the case, and there can be multiple times when an aggregate document 160 has been modified but has not yet been reconciled (also referred to as conflict resolution). This reconciliation is performed via merging of different versions of the aggregate document. As noted above, a merge is where two or more aggregate documents 160 (with the same base document 165-A) are brought together to create a new single (e.g., consistent) aggregate document 160.

Figure 2:
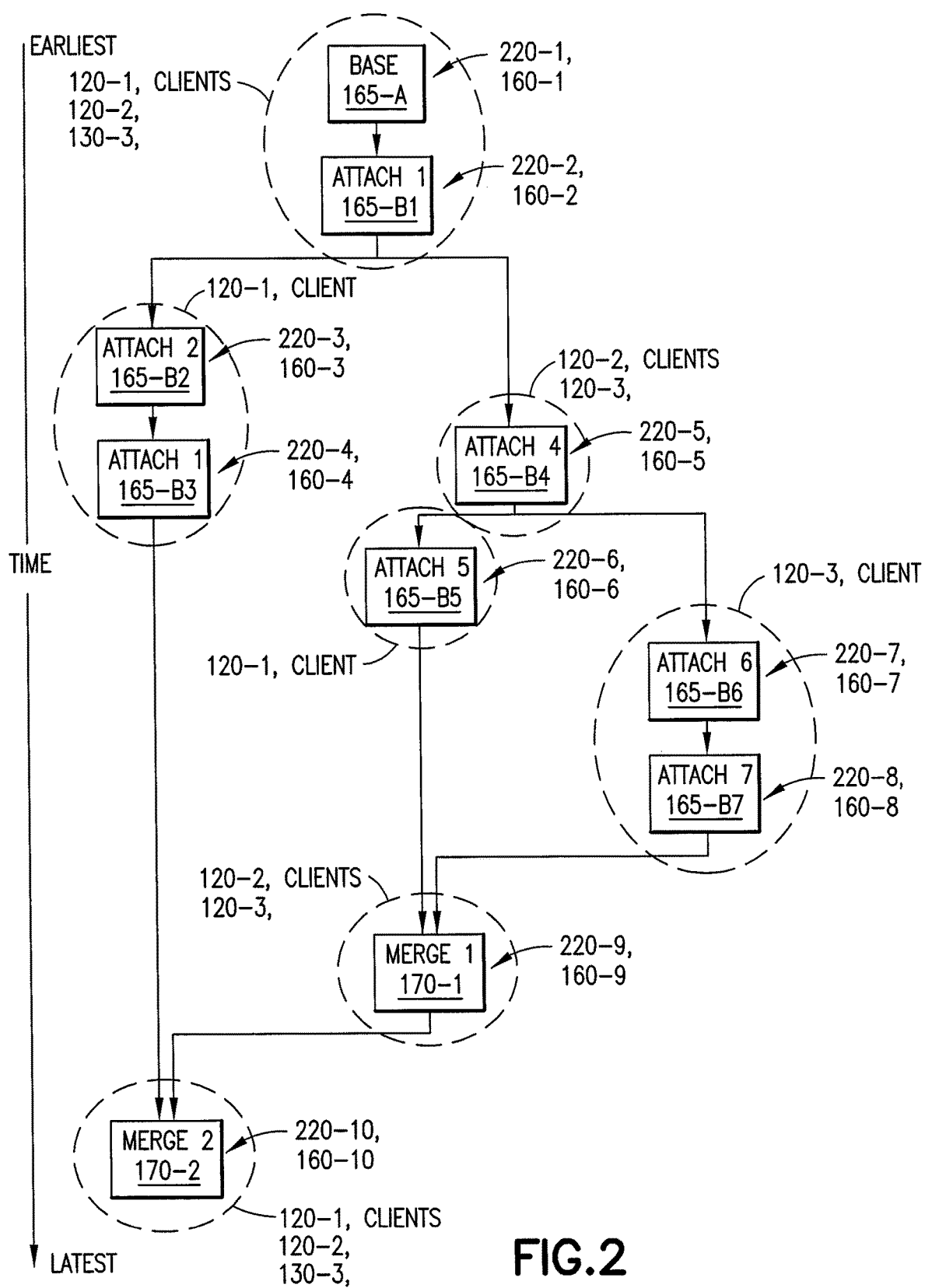
FIG. 2 is an example of actions that occur over time using an original aggregate document, to create multiple inconsistent aggregate documents, and merge operations that occur as part of the operations.

FIGS. 2 and 3 illustrate one set of possible actions that are performed on an original aggregate document to create multiple inconsistent aggregate documents, and how those inconsistent aggregate documents are reconciled. FIG. 2 is an example of actions 220 that occur over time using an original aggregate document 160, to create multiple inconsistent aggregate documents, and merge operations that occur as part of the operations. FIG. 3, split over FIGS. 3A and 3B, illustrates linear representations of the aggregate documents 160, as the actions in FIG. 2 occur. It is noted in these examples that a single user is the identity owner for these documents 160.

Turning to FIG. 2, there are multiple actions 220 that occur over time and that create different aggregate documents 160. The earliest time is at the top and the latest time is at the bottom. In this example, the user 105 uses multiple electronic devices, each with its own version of an aggregate document, which could be or not be the same as on the other devices. These client devices 120 are listed as the following: a first phone 120-1; a second phone 120-2; and a tablet 120-3. The actions that correspond to using those client devices are surrounded by dashed ovals.

In action 220-1, the base document 165-A, as the initial aggregate document 160-1, is placed on each of the devices. Assume again the passport scenario, such that the user 105 has a new passport, which is the base document 165-A. In action 220-2, the user 105 travels to a country and receives a stamp, indicated as a first attachment, Attach 1, 165-B1. This creates another aggregate document 160-2. Although a single device 120 may be used for this trip, the dashed lines around the actions 220-1 and 220-2 indicate that all three devices 120-1, 120-2, and 120-3 are synchronized to contain the latest aggregate document 160, in this case aggregate document 160-2.

The rest of the actions 220-2 through 220-10 concern fracturing of the aggregate document 160 into multiple different versions and the subsequent merging of these into a consistent aggregate document 160. These different version are contained in different clients 120, as described below, and the clients 120-1, 2, 3 cooperate, possibly through the issuing authority 110, to merge the documents.

The user 105 then uses the first phone 120-1 and leaves the other two devices at home, turned off, or otherwise unavailable for synchronization. The user 105 then uses the first phone 120-1 and receives two more attachments 165-B2 and 165-B3, corresponding to two actions 220-3 and 220-4 and two aggregate documents 160-3 and 160-4, respectively.

The user then 105 leaves phone 120-1 at home or otherwise makes it unavailable for synchronization. For action 220-5, which creates aggregate document 160-5 and has attachment 165-B4, both the second phone 120-2 and tablet 120-3 are synchronized and contain the document 160-5.

The user 105 then also leaves tablet 120-3 at home or otherwise makes it unavailable for synchronization. In action 220-6, the user 105 uses the second phone 120-2 and receives attachment 165-B5, which creates aggregate document 160-6.

The user then leaves phones 120-1 and 120-2 at home or these are otherwise unavailable for synchronization. The tablet 120-3 is used for actions 220-7 and 220-8, which add attachments 165-B6 and 165-B7, respectively, and create aggregate documents 160-7 and 160-8, respectively.

At some point, the second phone 120-2 and the tablet 120-3 are synchronized, say by recharging both while they are connected to the same network in the user's home. This is represented by action 220-9, which is in response to a synchronization that creates merge record 170-1 and aggregate document 160-9.

At a later time, the first phone 120-1 is turned on and synchronized with the second phone 120-2 and the tablet 120-3, and this represented by action 220-10 and merge record 170-2, which creates aggregate document 160-10.

FIG. 3, split over FIGS. 3A and 3B, illustrates linear representations of the aggregate documents, as the actions 220 in FIG. 2 occur. For ease of reference, the references to the base document, attachments, and merge records are not shown. Also, for space purposes, the timing in FIG. 2 is not repeated here. That is, in FIG. 2, the action 220-5 is later in time than action 220-4, but in FIG. 3, these appear to be performed at the same time.

FIG. 3A has actions 220-1 through 220-8. The first two actions 220-1, 220-2 should be self-explanatory. For the action 220-2, the aggregate document 160-3 comprises the base document and two attachments 1 and 2. The action 220-3 results in the aggregate document 160-3 of the base document and attachments 1 and 2. The action 220-4 results in the aggregate document 160-4 of the base document and attachments 1, 2, and 3. The action 220-5 results in the aggregate document 160-5 of the base document and attachments 1 and 4. The action 220-6 results in the aggregate document 160-6 of the base document and attachments 1, 4, and 5. The action 220-7 results in the aggregate document 160-7 of the base document and attachments 1, 4, and 6. The action 220-8 results in the aggregate document 160-8 of the base document and attachments 1, 4, 6, and 7.

FIG. 3B has actions 220-9 and 220-10, both of which involve merges. It should be noted that the merges may be performed by peer-to-peer communication using two or more of the client devices 120-1, 120-2, and 120-3. In action 220-9, a merge of the aggregate document 160-6 and aggregate document 160-8 is performed (e.g., using peer-to-peer communication for clients 120-2 and 120-3). This merge results in the aggregate document 160-9 of the following: the base document; attachments 1, 4, 5, 7, and 7; and merge record ("merge") 1. This forms a graph, with vertices 320 of the base document 165-A, attachments 165B-1, -4, -5, -6, and -7, and merge record 170-1 as vertices 320 (also called nodes) and arrows as edges 310. The arrows (edges 310) provide a reference to what has been merged and in what order. That is, merge 1 links to attachments 7 and 5. The attachment 7 is linked to attachment 6, which is linked to attachment 4, which is linked to attachment 1, which is linked to the base document. This list forms aggregate document 160-8. Similarly, the attachment 5 is linked to attachment 4, which is linked to attachment 1, which is linked to the base document. This list forms aggregate document 160-6. Thus, one can determine which documents were merged.

In action 220-10, a merge of the aggregate document 160-9 and aggregate document 160-4 is performed (e.g., using all three clients 120-1, 120-2, and 120-3). This merge results in the aggregate document 160-10 of the following: the base document; attachments 1 through 7; and merge records 1 and 2. Merge 2 links to attachment 3 and merge 1.

Merge 1 is as described previously. The attachment 3 is linked to attachment 2, which is linked to attachment 1, which is linked to the base document. This list forms aggregate document 160-4. The aggregate document 160-10 forms a graph, with vertices 320 of the base document 165-A, attachments 165B-1 through 165B-7, and merge records 170-1 and 170-2 as vertices 320 and arrows as edges 310.

It is seen via FIGS. 2 and 3 that even though there could be multiple aggregate documents 160 modified at different times and with different devices, these differences can be reconciled. Note also that a complete record of merges is created. This example is from the viewpoint of only the client device 120. However, similar processed may be performed by the issuing authority 110 and/or verifying party 130 to reconcile different aggregate documents 160.

V. Additional Detail: Other Examples

We present additional examples using the framework described above.

Consider the case of an issuing authority 110 distributing verifiable digital documents. We assume that the issuing authority 110 does due diligence (e.g., proofing) of the person's identity. The issuing authority 110 generates and distributes a digital document (e.g., passport, license, etc.) as a base document 165-A initially, and can revoke the digital signature associated with such documents. These documents may have a finite lifetime, e.g., one, month, one year, 10 years, or the like, as defined by policy of the issuing authority 110. The issuing authority 110 also provides the means for verifying the digital documents, including the means for verifying the documents when the verification system or service is not online. The issuing authority 110, or its delegate, provides means for distribution of the digital documents and verification, typically through software, networking (e.g., cellular data services) and services. For simplicity of this description, one might assume a service such as IBM's Mobile Identity (MI) system as the base technology. IBM Mobile Identity is a private and secure ecosystem of identity relationships that enables all involved to issue, manage, or verify identities of an individual.

Upon the base MI technology, there are agencies or authorities that both perform verification of documents and provide updates to the verifiable and digital base documents. The techniques described above may be use to "modify" the digital documents through, e.g., append operations. Consider the following threat model, outlined below:

1. Fake digital documents and/or attachments;

2. Insertion/appending of attachments that do not match the base document with its attachments;

3. Removal of the base document or attachments, such as reverting to an earlier version of the document and attachments (e.g., an element of freshness);

4. Attachments not being reported by the verifying party 130 to the issuing authority 110;

5. Multiple mobile devices, each with distinct versions of the digital documents (e.g., another element of freshness);

6. Updates of digital documents not reaching the (mobile) client (e.g., another element of freshness);

7. The user 105 is not present and the verifying party 130 generates fake attachments (e.g., liveness); and 8. The mobile device (e.g., as client device 120) has a more recent version of the document/attachment(s) than the version received from the authoritative source.

Below, we address each of these threats.

VI.1. Fake Digital Documents and/or Attachments

Each digital document and associated attachments is digitally signed. If a document or attachment is fake, signature verification will fail since the document has not been digitally signed by a trusted document or attachment issuer. This may rely on Public Key Infrastructure (PKI) technology. Nominally, the verifier software may have the public key(s) (e.g., digital certificates) of each of the trusted digital document issuers, e.g., the issuing authorities 110. Or there is a trust relationship between the root Certificate Authority (CA) and the document/attachment signers, as is typically available in a public key infrastructure (PKI).

Digital signature verification is well known. Certificate issuance and revocation is also well known.

VI.2. Insertion/Appending of Attachments that do not Match the Base Document and/or Attachments Each of the attachments 165-B may include a secure reference (e.g., hash) to the base document 165-A and any attachments 165-B upon which each additional attachment relies. See, e.g., the arrows used in FIG. 3B. If there is an attempt to modify the base document 165-A or dependent attachments 165-B to the base document, the digital signature of the illegitimate attachment will not verify. This prevents the attacker from inserting, removing, or appending fake attachments to a digital document.

Digital signature verification is well known, as is certificate issuance and revocation.

VI.3. Removal of the Base Document or Attachments

First we discuss how digital documents are updated on a mobile device (e.g., client device 120) via interaction with a verifying party 130.

The verifying party 130 challenges the user to present their digital document. See, e.g., step 3 of FIG. 1. The mobile device 120 (in this example) retrieves the base document, along with any associated attachments, and transmits them (or, as described above, some subset of them) to the verifying party 130. The verifying party 130 verifies the digital certificates and digital signatures on the base document and all associated attachments that are received. Structural integrity of the document and attachments is also verified (e.g., attachments to the base document or other related attachments are also valid). Assuming the document and attachments are valid, e.g., no fake documents/attachments, no invalid insertions or deletions, the verifying party 130 can assume that the document and its attachments are valid without needing to consult any external data sources. Removal of the base document or any individual attachment, or sequence of attachments, before the last attachment will be detected by the failure of the digital signature verification.

The problem is that the tail end of the attachments (one or more attachments) may have been removed. We consider two approaches to address this threat.

a. The verifying party 130 contacts an authoritative source (e.g., the issuing authority 110, the blockchain 140, or the like) to confirm that the presented document and attachments is the most recent and complete version. See, e.g., step 9 in FIG. 1. Confirmation can be done by comparing the base document and attachments (including the merge attachments). Alternatively, a secure hash of the document at the authoritative source can be compared to a secure hash of the document presented by the client 120. Assuming this is the most recent version that is known of the document and that the signatures verify, the verifying party 130 can conclude that this is a valid and complete document. If the presented document/attachments are not the most recent, the verifying party 130 can retrieve the most recent version from the authoritative source and verify the signatures. This authoritative version can then be used for any subsequent operations (e.g., appending an attachment). If necessary, the verifying party 130 can merge the version sent by the authoritative source (e.g., 120 or 140) with the version sent by the client 120.

b. Another exemplary solution is to use hardware-based techniques to ensure the integrity of document and attachments when stored on a mobile device 120. Examples include ARM TrustZone technology and Intel SGX. Arm TrustZone technology is a System on Chip (SoC) and CPU system-wide approach to security. TrustZone is hardware-based security built into SoCs by semiconductor chip designers who want to provide secure end points and a device root of trust. Intel SGX (software guard extensions) technology is for application developers who are seeking to protect select code and data from disclosure or modification. Intel SGX makes such protections possible through the use of enclaves, which are protected areas of execution in memory. Those skilled in the art will recognize how to exploit these technologies to securely create, update and manage secure digital documents and their attachments. When the client device 120 is using these technologies, it is more difficult, if not impossible, for the client 120 to manipulate or change (e.g., truncate) a digital document 160 with its attachments. However, since the user may use multiple mobile devices, there may be a more recent version of the document and its attachments. Using the previous techniques, verifying with an authoritative source, provides an extra measure of protection against malicious and/or inadvertent omission of document attachments.

VI.4. Attachments not being Reported by the Verifying Party 130 to the Issuing Authority 110

As will be described below, both the client device 120 and verifying party 130 report all activity—new attachments—to the issuing authority 110 (e.g., and/or authoritative source, such as the credential store 140). This serves as a protection against malicious activity by a client 120 or verifying party 130. As noted above, the authoritative source handles the case where the client's version of the document and corresponding attachments has been modified or is out of date. In the case of the verifying party 130 failing to report the activity, the client 120 will have the most recent version of the document and attachments. At intervals, e.g., specified by policy, the client 120 will report any new activity to the authoritative source (e.g., the issuing authority 110 and/or credential store 140). This may be at the time of receipt of any document updates, or later when (e.g., better) network connectivity becomes available.

VI.5. Multiple Mobile Devices, Each with Distinct Versions of the Digital Documents This case is similar to case VI.3, where each of the user's devices may have different version of the same document and attachments. This has been described in reference to FIGS. 2 and 3, but additional comments are presented here. By checking with an authoritative source such as the issuing authority 110 or the credential store 140, it is possible to detect when a document and its corresponding attachments are out of date and the most recent version can be retrieved from the authoritative source.

In addition, when it is detected that the devices 120 are out of synchronization, it is possible for the authoritative source to push the most recent version of the document/attachments to all of the user's devices 120 to ensure that they are all in possession of the same version. In the case where the verifying party 130 will be updating the document with new attachment(s), this update process may be deferred until after the attachment(s) is added.

Should the devices 120 remain out of synchronization, and the devices 120 and/or verifying party 130 fail to communicate the new attachments to the authoritative source, then there will be independent and distinct versions of the aggregate document 160 that need to be merged, e.g., by the issuing authority 110. The versions of the document/attachment(s) can be represented as a lattice, where Top is the base document. The paths are the sequences of attachments held by the different devices at different times. Bottom is a document attachment that represents the join of the multiple versions of the aggregate document 160 and verification of the multiple paths as represented by the merge attachment 170-M. See, e.g., FIGS. 3A and 3B, where the document attachment could be, e.g., Attach 7 for the aggregate document 160-8. For verification purposes, this will represent the new Top. This pattern (Top, paths, Bottom) may repeat multiple times during the lifetime of the document. To verify such a structure, each path would verify as had previously been verified. However, at each join (e.g., an attach), the paths could be ordered using an agreed upon algorithm, a composite hash computed, and the generation of a new merge attachment 170-M that contains the hash and signature of the prior document and attachment paths. Graphically, this can be represented as a Boolean circuit with all AND gates. Note that there may be use cases where OR gates are also useful.

In addition, the user's devices 120 can perform peer-to-peer exchange of their respective documents/attachment(s). When one copy of the document/attachment(s) is not a superset of the other, the devices can independently merge the documents and create and append a merge document, to effectively merge the independent copies. After the authoritative source receives a copy of such a merged document, the authoritative source can redistribute it to the mobile devices.

Other representations of secure merging of the multi-version documents are possible, and may be dependent on the data structures chosen to implement the documents.

VI.6. Updates of Digital Documents not Reaching the (Mobile) Client

The most recent version of a digital document and its attachments, together being the aggregate document 160, may not be received by the client device 120 such as a mobile device. This presents a freshness problem. This is like case VI.5, where there are multiple devices with different versions of the same document/attachment(s). When the verifying party 130 checks against the authoritative source (e.g., the issuing authority 110 or the credential store 140), the verifying party 130 will discover that the client 120 does not have the most recent version and will retrieve the most recent version from the authoritative source. See, e.g., step 9 in FIG. 1. Any updates can be performed on this version and the changes are sent to the user's device 120 and authoritative source as previously described.

VI.7. User is not Present and the Verifying Party 130 Generates Fake Attachments Another threat is the creation of fake attachments by a legitimate verifying party 130. This can be addressed by a liveness test. Once the verifying party 130 attaches and signs the new aggregate document (base document plus attachments), the aggregate document 160 is sent back to the client 120. The client 120 then signs this new aggregate document and sends the document to the verifying party 130. Note that the signing process may include a timestamp to indicate when the signing occurred. This handshake demonstrates that both the client and the verifying party 130 were communicating with one another at the time of the inclusion of the new attachment.

VI.8. The Mobile Device (e.g., as Client Device 120) has a More Recent Version of the Document/Attachment(s) than the Version Received from the Authoritative Source The client device 120 will merge (as described in VI.5 above) the local copy of the aggregate document 160 with the version received from the authoritative source (e.g., the issuing authority 110 or credential store 140) and send that updated version back to the authoritative source.

VI.9. Other Issues

Other possible issues are as follows.
Concerning initializing/updating the root certificates for the PKI:
  a. If there is an agreed upon process for centralized initialization and updating of the PKI roots, similar to what web browsers do, then there should never be an opportunity for missing root certificates.
  b. If there is no centralized authority, then the new roots can be dynamically discovered. The unfortunate side effect is that the client 120 or verifying party 130 will have to handle the "error" of an unrecognized certificate. The users of the client 120 or verifying party 130 are likely the least likely to know how to handle this error. There can be a default action (e.g., accept) and this error is pushed up to a higher authority (e.g., the issuing authority 110). In general, this is outside the scope of this invention.

VII. Further Details

One example is the following. A multi-party secure and distributed multi-part digital document system is disclosed, where the following are implemented: a third party is able to verify an origin of a base document and each part of multiple parts of an aggregate document, where unauthorized additions or deletions can be detected, where multi-party document fragments may be distributed across multiple systems, where unauthorized updates by a third party can be detected by one or more of a verifying party and client, and where multiple client devices can merge their respective partial multi-party documents into a single multi-party document.

Another example is the above system, where the multi-part digital document system protects the document parts via digital signatures. Another example is where the digital signature certificates are based on a PKI.

Another example is the above system, where the multi-part digital documents are stored in one or more centralized or distributed databases. A reference version of the multi-party document may be retrieved to obtain documents parts that are not present in the version presented by the client. The distributed database may be a blockchain.

Another example is the above system, where verification of the multi-part document is structured as one or more of a secure digital log based on digital signatures, a Merkel Tree, and/or a lattice where the digital signatures are on the nodes on all paths leading back to a Top of the lattice.

Another example is the above system, where detection of unauthorized additions or deletions is detected by not being able to verify the digital signatures applied to a multi-part document, and a centralized or distributed database is consulted to verify that the client has not removed a document part.

Another example is the above system, where multiple client devices establish peer-to-peer communication and create a single multi-part document via sharing of their respective multi-part document fragments.

Another example is the above system, where the client or verifying party updates centralized or distributed databases by communicating changes to an authorized verifying party 130, issuing authority 110, or an authorized agent of the same.

Another example is the above system, where the multi-part digital document, its signed hash, or equivalent, is stored in secure hardware in the client or issuing authority 110 or credential store 140 or verifying party 130. The secure hardware may perform a handshake with a centralized or distributed database to ensure integrity of the multi-part document.

To reiterate, an authenticated base digital document is a subset of an authenticated aggregate digital document. Note that the receiving entity (e.g., client, verifier, issuing authority) should usually (e.g., always) verify the authenticity and integrity of what the entity receives, resulting in an authenticated base/aggregate digital document. Note that it is possible that a client will receive an aggregate digital document from the issuing authority or a verifying party. It is also possible that a client could receive a base or aggregate digital document from another client. It is also possible for the client to retrieve a base or aggregate digital document from a credential store.

Figure 4:
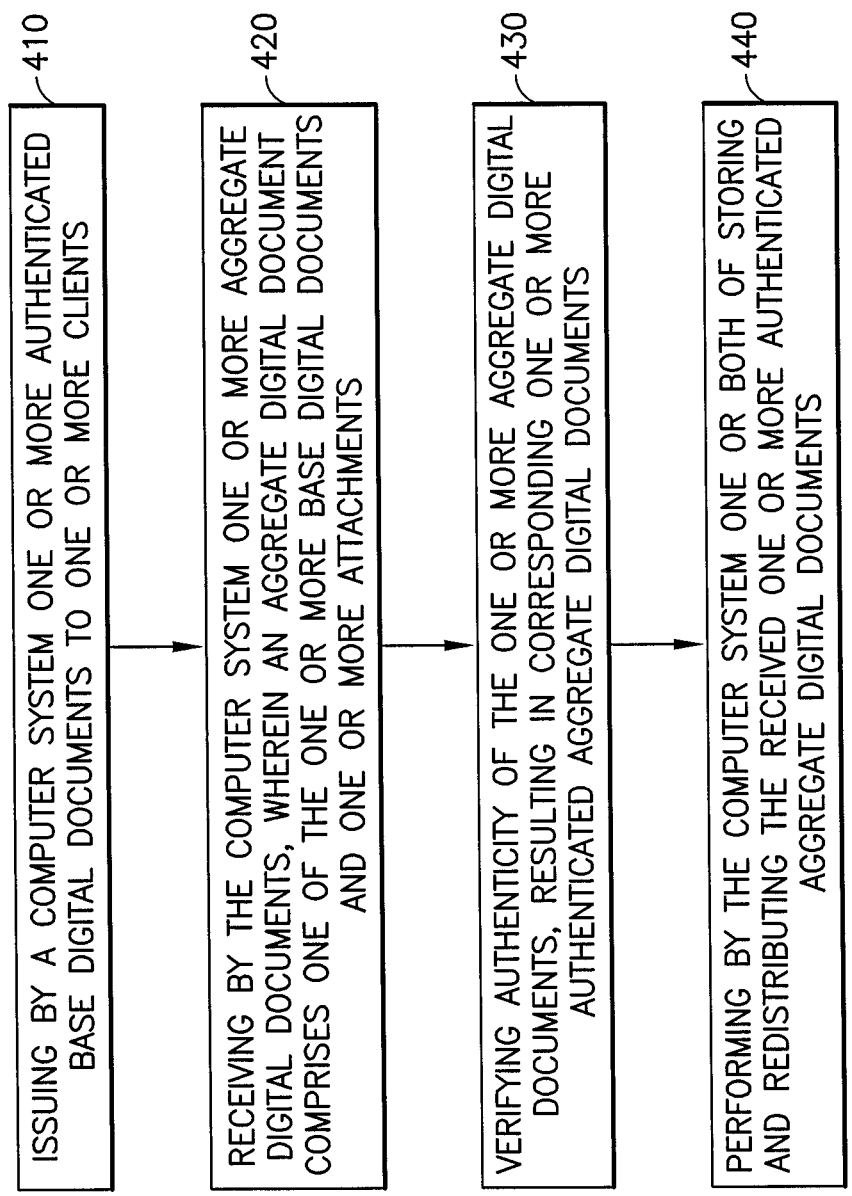
FIG. 4 is a flowchart of an exemplary method performed by an issuing authority, in accordance with an exemplary embodiment.

Further examples are as follows.
Referring to FIG. 4, this figure is a flowchart of an exemplary method performed by an issuing authority 110, in accordance with an exemplary embodiment. The method comprises in block 410, issuing by a computer system one or more authenticated base digital documents to one or more clients. The method includes in block 420 receiving by the computer system one or more aggregate digital documents. An aggregate digital document comprises one of the one or more base digital documents and one or more attachments. The method further includes verifying authenticity of the one or more aggregate digital documents, resulting in corresponding one or more authenticated aggregate digital documents. See block 430. In block 440, the method includes performing by the computer system one or both of storing and redistributing the received one or more authenticated aggregate digital documents.

Another example is the method of FIG. 4, where an authenticated base digital document and the corresponding one or more authenticated attachments for an aggregate digital document form vertices of a graph and the corresponding one or more authenticated attachments indicate an order of attachment forming edges between the vertices.

A further example is the method of FIG. 4, further comprising merging two or more versions of an authenticated aggregate digital document, the merging reconciling the two or more versions of the aggregated digital document and preserving an order of attachment for attachments in both versions, the merging creating a merged authenticated aggregated digital document that includes preservation of integrity and authenticity of the merged aggregated digital document and its attachments.

An additional example is the method of FIG. 4, further comprising updating an authenticated aggregate digital document by securely attaching one or more authenticated attachments to the authenticated aggregate digital document, the attaching preserving authenticity and integrity of the updated authenticated aggregate digital document and its attachments and preserving an order of attachment for the one or more attachments. Another example is the method of this paragraph, further comprising redistributing the updated authenticated aggregate digital document.

Turning now to FIG. 5, a flowchart is shown of an exemplary method performed by a verifying party 130, in accordance with an exemplary embodiment. The method comprises, in block 510, sending by a computer system one or more authentication challenges to a client requesting part or all of an aggregate digital document from the client be verified. The aggregate digital document comprises a base digital document or a base digital document with one or more attachments. The method includes receiving, in block 520, by the computer system from the client the part or all of the aggregate digital document. The method also includes verifying by the computer system authenticity and integrity of the part or all of the aggregate digital document, resulting in an authenticated aggregate digital document. See block 530.

Another example is the method of FIG. 5, wherein verifying by the computer system authenticity of the part or all of the authenticated aggregate digital document comprises verifying the authenticity and the integrity of the part or all of the aggregate digital document at least by verifying authenticity associated with the part or all of the aggregate digital document.

A further example is the method of FIG. 5, wherein the authenticated aggregate digital document comprises the base digital document with one or more attachments, and wherein the base digital document and the one or more attachments form vertices of a graph and the one or more attachments indicate an order of attachment forming edges between the vertices.

An additional example is the method of FIG. 5, further comprising sending a given attachment for the authenticated aggregate digital document to the client, the given attachment comprising information demonstrating authenticity of the given attachment and comprising information preserving an order of attachment from the given attachment to the base digital document or to at least one attachment of the one or more attachments for the authenticated aggregate digital document.

Another example is the method of FIG. 5, wherein the part or all of the authenticated aggregate digital document comprises one or more attributes corresponding to part or all of the base digital document and the one or more attachments, and the verifying comprises verifying authenticity of cryptographic features corresponding to the one or more attributes.

Another example is the method of FIG. 5, further comprising merging two or more versions of an authenticated aggregate digital document, the merging reconciling the two or more versions of the aggregated digital document and preserving an order of attachment for attachments in both versions, the merge creating an authenticated merged aggregated digital document.

A further example is the method of the previous paragraph, wherein one of the two or more versions is received from the client and another of two or more versions is received from one or more of the following: storage; one or more other clients; or an issuing authority. A further example is the method of the previous paragraph, wherein the two or more versions are received from multiple clients.

An additional example is the method of FIG. 5, further comprising updating an authenticated aggregate digital document by securely attaching one or more authenticated attachments to the verified authenticated aggregate digital document to create an updated authenticated aggregate digital document, the attaching preserving integrity of the updated authenticated aggregate digital document and its attachments and preserving an order of attachment for the one or more attachments. A further example is the method of this paragraph, further comprising redistributing the updated authenticated aggregate digital document.

Referring to FIG. 6, this figure is a flowchart of an exemplary method performed by a client 120, in accordance with an exemplary embodiment. The method of FIG. 6 comprises receiving, in block 610, one of a base digital document or an aggregate digital document from one of an issuing authority, a client, a credential store, or a verifying party. The aggregate digital document comprises the base digital document one or more attachments. The method includes verifying, in block 620, authenticity of the base digital document or the aggregated digital document, resulting in an authenticated aggregate digital document. The method of FIG. 6 also includes in block 630 receiving at the computer system authentication challenges from a verifying party for the authenticated aggregate digital document. As stated previously, the authenticated aggregate digital document comprises the authenticated base digital document or the authenticated base digital document and one or more attachments. The method includes in block 640 sending by the computer system part or all of the authenticated aggregate digital document to the verifying party for verification by the verifying party.

A further example is the method of FIG. 6, wherein the aggregate digital document comprises the authenticated base digital document with the one or more attachments, and wherein the authenticated base digital document and the one or more attachments form vertices of a graph and the one or more attachments indicate an order of attachment forming edges between the vertices.

Another example is the method of FIG. 6, wherein the part or all of the aggregate digital document comprises one or more attributes corresponding to part or all of the base digital document and the one or more attachments, and the sending comprising sending the one or more attributes to the verifying party for verification by the verifying party.

An additional example is the method of FIG. 6, further comprising merging two or more versions of the authenticated aggregate digital document, the merging reconciling the two or more versions of the aggregated digital document and preserving an order of attachment for attachments in both versions, the merge creating a merged authenticated aggregated digital document.

A further example is the method of the previous paragraph, wherein at least one of the two or more versions is received from a client and another of versions is received from one or more of the following: storage; one or more other clients; or the issuing authority.

An additional example is the method of FIG. 6, further comprising updating the authenticated aggregate digital document by securely attaching authenticated attachments to the authenticated aggregate digital document. A further example is the method of this paragraph, further comprising redistributing the updated authenticated aggregate digital document.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
issuing by a computer system one or more authenticated base digital documents to one or more clients;
receiving by the computer system one or more aggregate digital documents, wherein an aggregate digital document comprises one of the one or more base digital documents and one or more attachments;
verifying authenticity of the one or more aggregate digital documents, resulting in corresponding one or more authenticated aggregate digital documents; and
performing by the computer system one or both of storing and redistributing the received one or more authenticated aggregate digital documents,
where an authenticated base digital document and the corresponding one or more authenticated attachments for an aggregate digital document form vertices of a graph, and the corresponding one or more authenticated attachments indicate an order of attachment forming edges between the vertices.

2. The method of claim 1, further comprising merging two or more versions of an authenticated aggregate digital document, the merging reconciling the two or more versions of the aggregated digital document and preserving an order of attachment for attachments in both versions, the merging creating a merged authenticated aggregated digital document that includes preservation of integrity and authenticity of the merged aggregated digital document and its attachments.

3. The method of claim 1, further comprising updating an authenticated aggregate digital document by securely attaching one or more authenticated attachments to the authenticated aggregate digital document, the attaching preserving authenticity and integrity of the updated authenticated aggregate digital document and its attachments and preserving an order of attachment for the one or more attachments.

4. The method of claim 3, further comprising redistributing the updated authenticated aggregate digital document.

5. A computer program product comprising a computer-readable storage medium having program instructions embodied therewith, the program instructions executable by a computer system to cause the computer system to perform the method of claim 1.

6. A method, comprising:
sending by a computer system one or more authentication challenges to a client requesting part or all of an aggregate digital document from the client be verified, the aggregate digital document comprising a base digital document or a base digital document with one or more attachments;
receiving by the computer system from the client the part or all of the aggregate digital document; and
verifying by the computer system authenticity and integrity of the part or all of the aggregate digital document, resulting in an authenticated aggregate digital document,
wherein the authenticated aggregate digital document comprises the base digital document with one or more attachments, and wherein the base digital document and the one or more attachments form vertices of a graph and the one or more attachments indicate an order of attachment forming edges between the vertices.

7. The method of claim 6, wherein verifying by the computer system authenticity of the part or all of the authenticated aggregate digital document comprises verifying the authenticity and the integrity of the part or all of the aggregate digital document at least by verifying authenticity associated with the part or all of the aggregate digital document.

8. The method of claim 6, further comprising sending a given attachment for the authenticated aggregate digital document to the client, the given attachment comprising information demonstrating authenticity of the given attachment and comprising information preserving an order of attachment from the given attachment to the base digital document or to at least one attachment of the one or more attachments for the authenticated aggregate digital document.

9. The method of claim 6, wherein the part or all of the authenticated aggregate digital document comprises one or more attributes corresponding to part or all of the base digital document and the one or more attachments, and the verifying comprises verifying authenticity of cryptographic features corresponding to the one or more attributes.

10. The method of claim 6, further comprising merging two or more versions of an authenticated aggregate digital document, the merging reconciling the two or more versions of the aggregated digital document and preserving an order of attachment for attachments in both versions, the merge creating an authenticated merged aggregated digital document.

11. The method of claim 10, wherein the two or more versions are received from multiple clients.

12. The method of claim 6, further comprising updating an authenticated aggregate digital document by securely attaching one or more authenticated attachments to the verified authenticated aggregate digital document to create an updated authenticated aggregate digital document, the attaching preserving integrity of the updated authenticated aggregate digital document and its attachments and preserving an order of attachment for the one or more attachments.

13. The method of claim 12, further comprising redistributing the updated authenticated aggregate digital document.

14. A computer program product comprising a computer-readable storage medium having program instructions embodied therewith, the program instructions executable by a computer system to cause the computer system to perform the method of claim 6.

15. A method, comprising:
sending by a computer system one or more authentication challenges to a client requesting part or all of an aggregate digital document from the client be verified, the aggregate digital document comprising a base digital document or a base digital document with one or more attachments;
receiving by the computer system from the client the part or all of the aggregate digital document;
verifying by the computer system authenticity and integrity of the part or all of the aggregate digital document, resulting in an authenticated aggregate digital document; and
merging two or more versions of an authenticated aggregate digital document, the merging reconciling the two or more versions of the aggregated digital document and preserving an order of attachment for attachments in both versions, the merge creating an authenticated merged aggregated digital document,
wherein at least one of the two or more versions of the authenticated aggregate digital document is received from the client and at least one other one of the two or more versions of the authenticated aggregate digital document is received from one or more of the following: storage; one or more other clients; or an issuing authority.

16. A method, comprising:
receiving at a computer system one of a base digital document or an aggregate digital document from one of an issuing authority, a client, a credential store, or a verifying party, wherein the aggregate digital document comprises the base digital document one or more attachments;
verifying by the computer system authenticity of the base digital document or the aggregated digital document, resulting in an authenticated aggregate digital document;
receiving at the computer system authentication challenges from a verifying party for the authenticated aggregate digital document; and
sending by the computer system part or all of the authenticated aggregate digital document to the verifying party for verification by the verifying party,
wherein the aggregate digital document comprises the authenticated base digital document with the one or more attachments, and wherein the authenticated base digital document and the one or more attachments form vertices of a graph and the one or more attachments indicate an order of attachment forming edges between the vertices.

17. The method of claim 16, wherein the part or all of the aggregate digital document comprises one or more attributes corresponding to part or all of the base digital document and the one or more attachments, and the sending comprising sending the one or more attributes to the verifying party for verification by the verifying party.

18. The method of claim 16, further comprising merging two or more versions of the authenticated aggregate digital document, the merging reconciling the two or more versions of the aggregated digital document and preserving an order of attachment for attachments in both versions, the merge creating a merged authenticated aggregated digital document.

19. The method of claim 16, further comprising updating the authenticated aggregate digital document by securely attaching authenticated attachments to the authenticated aggregate digital document.

20. A computer program product comprising a computer-readable storage medium having program instructions embodied therewith, the program instructions executable by a computer system to cause the computer system to perform the method of claim 16.

21. A method, comprising:
receiving at a computer system one of a base digital document or an aggregate digital document from one of an issuing authority, a client, a credential store, or a verifying party, wherein the aggregate digital document comprises the base digital document one or more attachments;
verifying by the computer system authenticity of the base digital document or the aggregated digital document, resulting in an authenticated aggregate digital document;
receiving at the computer system authentication challenges from a verifying party for the authenticated aggregate digital document;
sending by the computer system part or all of the authenticated aggregate digital document to the verifying party for verification by the verifying party; and
merging two or more versions of the authenticated aggregate digital document, the merging reconciling the two or more versions of the aggregated digital document and preserving an order of attachment for attachments in both versions, the merge creating a merged authenticated aggregated digital document,
wherein at least one of the two or more versions is received from a client and another of versions is received from one or more of the following: storage; one or more other clients; or the issuing authority.

\* \* \* \* \*